(12) United States Patent
Kamatani et al.

(10) Patent No.: US 11,685,439 B2
(45) Date of Patent: Jun. 27, 2023

(54) DRIVING ASSISTANCE APPARATUS (71) Applicant: TOYOTA JIDOSHA KABUSHIKI KAISHA, Toyota (JP)

(72) Inventors: Miyuki Kamatani, Susono (JP); Minami Sato, Ebina (JP); Kazuyuki Fujita, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 557 days.

(21) Appl. No.: 16/520,552

(22) Filed: Jul. 24, 2019

(65) Prior Publication Data
US 2020/0031394 A1 Jan. 30, 2020

(30) Foreign Application Priority Data

Jul. 25, 2018 (JP) .............................. JP2018-139804

(51) Int. Cl.
*B62D 15/02* (2006.01)
*G06V 20/56* (2022.01)
*G06V 40/10* (2022.01)

(52) U.S. Cl.
CPC ....... *B62D 15/0265* (2013.01); *G06V 20/588* (2022.01); *G06V 40/103* (2022.01)

(58) Field of Classification Search
None
See application file for complete search history.

(56) References Cited

U.S. PATENT DOCUMENTS

| 2012/0226392 A1* | 9/2012 | Kataoka | G06K 9/00798 701/1 |
| 2012/0265418 A1* | 10/2012 | Foerster | G08G 1/166 701/70 |
| 2014/0236428 A1* | 8/2014 | Akiyama | B60W 10/184 701/42 |

(Continued)

FOREIGN PATENT DOCUMENTS

| JP | 2015-155295 A | | 8/2015 |
| JP | 2016002959 A | * | 1/2016 |
| JP | 2017-095100 A | | 6/2017 |

OTHER PUBLICATIONS

"Akihiro Watanabe, Steering assist control device, 2016" (Year: 2016).*

*Primary Examiner* — James M McPherson
*Assistant Examiner* — Bakari Underwood
(74) *Attorney, Agent, or Firm* — Sughrue Mion, PLLC (57) ABSTRACT

A driving assistance apparatus includes: an assist device configured to perform a steering assist in which a steering torque for steering a vehicle in a direction away from a pedestrian is applied to the vehicle; and a canceller configured to cancel the steering assist if a cancellation condition is satisfied. The cancellation condition includes: a first condition caused by that at least a part of a traffic lane is not recognized; and a second condition caused by that a vehicle operation by a driver is performed. The canceller applies a steering torque in an opposite direction, which is opposite to a direction of the steering torque applied by the steering assist, to the vehicle if the first condition is satisfied, and is configured to increase a torque change amount per unit time of the steering torque in the opposite direction in comparison with when the second condition is satisfied.

7 Claims, 3 Drawing Sheets (56) References Cited

U.S. PATENT DOCUMENTS

| | | | |
|---|---|---|---|
| 2015/0025743 A1* | 1/2015 | Tamura | B62D 6/04 |
| | | | 701/41 |
| 2015/0210279 A1 | 7/2015 | Agnew et al. | |
| 2016/0176400 A1* | 6/2016 | Nakano | B60W 30/12 |
| | | | 701/41 |
| 2019/0210638 A1* | 7/2019 | Ueno | B62D 15/021 |

* cited by examiner

DRIVING ASSISTANCE APPARATUS

CROSS-REFERENCE TO RELATED APPLICATIONS

This application is based upon and claims the benefit of priority of the prior Japanese Patent Application No. 2018-139804, filed on Jul. 25, 2018, the entire contents of which are incorporated herein by reference.

BACKGROUND

1. Technical Field

Embodiments of the present disclosure relate to a driving assistance apparatus.

2. Description of the Related Art

For this type of apparatus, for example, there is proposed an apparatus configured to automatically steer a host vehicle and automatically control a speed of the host vehicle when a pedestrian close to the host vehicle is detected, so that the host vehicle drives away from the pedestrian in a present traffic lane, so as to pass the pedestrian, wherein the apparatus is configured to automatically steer the host vehicle so that the host vehicle approaches a traffic lane center after the host vehicle passes the pedestrian (refer to Japanese Patent Application Laid Open No. 2017-095100 (Patent Literature 1) and Japanese Patent Application Laid Open No. 2015-155295 (Patent Literature 2)).

In this type of apparatus, when the automatic steering is performed by the apparatus, for example, if an operation of the vehicle by a driver is performed, or for example, if a predetermined condition to cancel the steering by the apparatus, the steering by the apparatus is canceled in many cases. At this time, if the steering by the apparatus is simply canceled, the driver possibly feels discomfort. The technologies/techniques described in the Patent Literatures 1 and 2 do not disclose the operation of the apparatus when the steering by the apparatus is canceled, which is technically problematic.

SUMMARY

In view of the aforementioned problem, it is therefore an object of embodiments of the present disclosure to provide a driving assistance apparatus that can cancel driving assistance while preventing the driver from feeling discomfort.

The above object of embodiments of the present disclosure can be achieved by a driving assistance apparatus including: a recognizer configured to recognize a surrounding environment of a vehicle; and an assist device configured to perform a steering assist in a width direction of a traffic lane on which the vehicle is driving if a pedestrian is recognized by the recognizer within a predetermined range from the vehicle, wherein a steering torque for steering the vehicle in a direction in which the vehicle goes away from the pedestrian is applied to the vehicle in the steering assist, the driving assistance apparatus provided with: a canceller configured to cancel the steering assist if a predetermined cancellation condition is satisfied when the steering assist is performed, wherein the cancellation condition includes: a first condition caused by that at least a part of the traffic lane is not recognized by the recognizer; and a second condition caused by that a vehicle operation by a driver of the vehicle is performed, and the canceller is configured to apply a steering torque in an opposite direction, which is opposite to a direction of the steering torque applied by the steering assist, to the vehicle if the first condition is satisfied and the steering assist is thus cancelled, and is configured to increase a torque change amount per unit time of the steering torque in the opposite direction in comparison with when the second condition is satisfied and the steering assist is thus cancelled.

DETAILED DESCRIPTION OF THE EMBODIMENT

A driving assistance apparatus according to an embodiment of the present disclosure will be explained with reference to FIG. 1 to FIG. 3.

(Configuration)

A configuration of the driving assistance apparatus according the embodiment will be explained with reference to FIG. 1. FIG. 1 is a block diagram illustrating the configuration of the driving assistance apparatus according to the embodiment.

Figure 1:
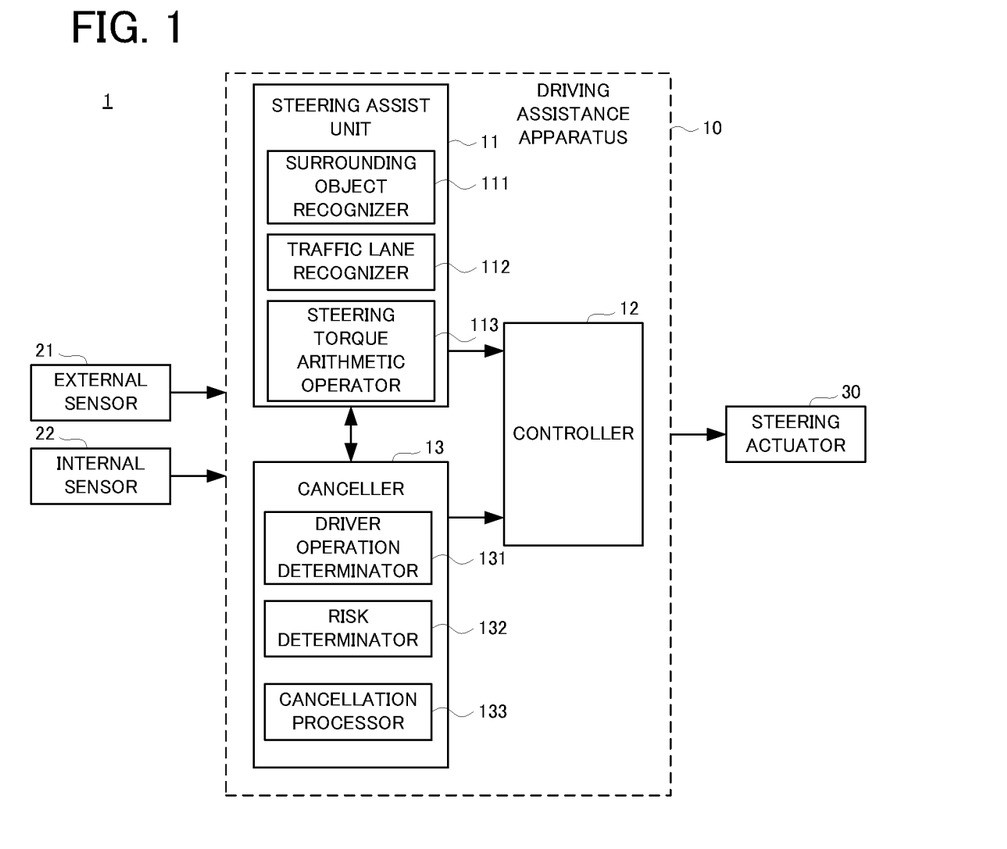
FIG. 1 is a block diagram illustrating a configuration of a driving assistance apparatus according to an embodiment.

In FIG. 1, a driving assistance apparatus 10 is mounted on a vehicle 1. Here, the vehicle 1 is provided with an external sensor 21, an internal sensor 22, and a steering actuator 30. The external sensor 21 may include, for example, a camera that can capture or image a scene outside the vehicle 1, a radar, and the like. The internal sensor 22 may include, for example, a vehicle speed sensor, a yaw rate sensor, a steering angle sensor, a shift position sensor, an accelerator sensor, a brake sensor, a turn signal sensor, and the like. A detailed explanation of the external sensor 21 and the internal sensor 22 will be omitted because the existing technologies/techniques can be applied thereto.

The driving assistance apparatus 10 is provided with a steering assist unit 11, a controller 12, and a canceller 13, as processing blocks logically realized therein, or as processing circuits physically realized therein.

The steering assist unit 11 is configured to perform a steering assist for driving the vehicle 1 at an appropriate distance from a pedestrian, if there is the pedestrian ahead in a moving direction of the vehicle 1. The steering assist unit 11 may have a surrounding object recognizer 111, a traffic lane recognizer 112, and a steering torque arithmetic operator 113, so as to realize the steering assist. The "pedestrian" is not limited to a pedestrian, but may conceptually include a person equivalent to the pedestrian, such as, for example, a user of a bicycle or an electric cart.

The surrounding object recognizer 111 is configured to obtain an output of the external sensor 21 (e.g., an image captured or imaged by the camera, a result of measurement by the radar, etc.), and to recognize an object that is around the vehicle 1. The surrounding object recognizer 111 may particularly recognize a pedestrian who is within a predetermined range from the vehicle 1. The "predetermined range" may vary depending, for example, on a speed of the vehicle 1, a road structure (a road width, presence/absence of a guardrail, presence/absence of a sidewalk, etc.) or the like, but may be set as a range in which some measurements (e.g., the steering assist) are to be taken so that the vehicle 1 safely passes by the recognized pedestrian.

The traffic lane recognizer 112 is configured to obtain an output of the external sensor 21 and to recognize a traffic lane on which the vehicle 1 is currently driving. The existing technologies/techniques can be applied to recognize the traffic lane, but an example is a method of recognizing the traffic lane by recognizing a white line for defining the lane.

The steering torque arithmetic operator 113 is configured to arithmetically operate a steering torque for changing a course of the vehicle 1 so that a distance in a road width direction between the pedestrian and the vehicle 1 is a predetermined distance, in order that the vehicle 1 safely passes by the pedestrian recognized by the surrounding object recognizer 111, as a part of the steering assist. The "predetermined distance" may vary depending, for example, on the speed of the vehicle 1 and the road structure, as in the "predetermined range" described above. The "predetermined distance" may be set as a distance that allows the vehicle 1 to safely pass by the pedestrian, for example, on the basis of a relation among the speed of the vehicle, the distance in the road width direction between the pedestrian and the vehicle, and a possibility of a collision between the pedestrian and the vehicle, wherein the relation is obtained by simulations.

Note that the "steering torque" may be a torque for applying a steering angle to steered wheels of the vehicle 1 and is conceptually different from a torque for assisting a driver's operation for a steering wheel (a so-called assist torque).

The steering torque arithmetic operator 113 is configured to output the arithmetically operated steering torque to the controller 12. The controller 112 is programmed or configured to control the steering actuator 30 on the basis of the steering torque.

The canceller 13 is configured to cancel the steering assist, on condition that an operation of the vehicle 1 by the driver is performed, and/or on condition the traffic lane is no longer recognized by the traffic lane recognizer 112, when the steering assist is performed by the steering assist unit 11. The canceller 13 may have a driver operation determinator 131, a risk determinator 132, and a cancellation processor 133, so as to realize the cancellation of the steering assist.

The driver operation determinator 131 is configured to obtain an output of the internal sensor 22 and to determine whether or not an operation of the vehicle 1 by the driver is performed. The risk determinator 132 is configured to obtain, for example, outputs of the surrounding object recognizer 111 and the traffic lane recognizer 112, and to determine whether or not a risk is high in a situation in which the vehicle 1 is placed. The cancellation processor 133 is configured to perform a cancellation process according to results of the determination by the driver operation determinator 131 and the risk detemrinator 132. The details of the driver operation determinator 131, the risk detemrinator 132 and the ancellation processor 133 will be described later.

The expression "the operation of the vehicle 1 by the driver is performed" may mean that an operation amount by the driver (e.g., an amount of stepping an accelerator pedal, an amount of stepping a brake pedal, operation amount of the steering wheel, etc.) has changed, for example, beyond an error range associated with the internal sensor 22, from an operation amount by the driver at the start of the steering assist.

The expression "the risk is high" is a relative concept, but may mean that the steering assist causes a situation in which an occupant including the driver vehicle 1 is at risk if no measures are taken. The expression "the risk is high in the situation in which the vehicle 1 is placed" will be hereinafter referred to as "there is an environmental risk", as occasion demands.

(Overview of Operation)

Next, the behavior of the vehicle 1 in operation of the driving assistance apparatus 10 will be explained with reference to FIG. 2A to FIG. 2C. FIG. 2A to FIG. 2C are diagrams illustrating specific examples of the steering assist according to the embodiment.

Figure 2A:
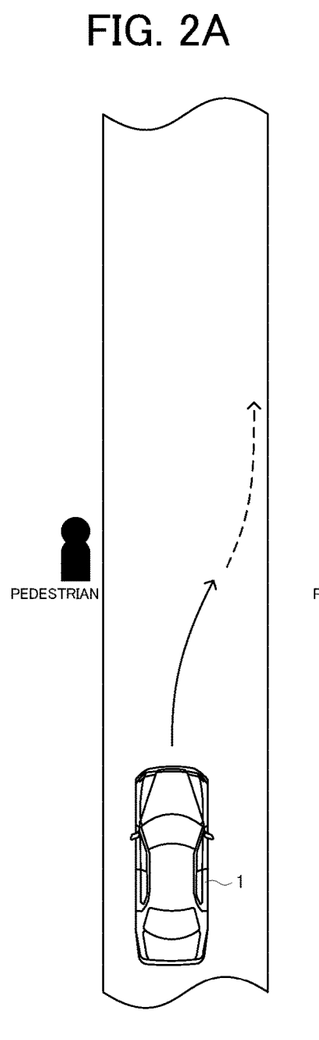
FIG. 2A is a diagram illustrating a specific example of a steering assist according to the embodiment.

FIG. 2A illustrates the behavior of the vehicle 1 when the steering assist is performed by the steering assist unit 11 and the steering assist is not canceled by the canceller 13.

In this case, firstly, if a pedestrian who is within the predetermined range from the vehicle 1 is recognized by the surrounding object recognizer 111 of the steering assist unit 11, the steering torque arithmetic operator 113 may arithmetically operate the steering torque for changing the course of the vehicle 1 so that the distance in the road width direction between the pedestrian and the vehicle 1 is the predetermined distance, wherein the steering torque will be hereinafter referred to as an "avoidance steering torque" as occasion demands. When the avoidance steering torque (i.e., a steering torque command value) is inputted to the controller 12, the steering actuator 30 is controlled by the controller 12 to generate a steering torque corresponding to the avoidance steering torque. As a result, the course of the vehicle 1 is changed as illustrated in a solid-line arrow in FIG. 2A.

The steering torque arithmetic operator 113 may then arithmetically operate a steering torque for adjusting the posture of the vehicle 1 so that the vehicle 1 does not deviate from the traffic lane recognized by the traffic lane recognizer 112 (in other words, so that the vehicle 1 drives along the recognized traffic lane). When the arithmetical operated steering torque is inputted to the controller 12, the steering actuator 30 is controlled by the controller 12 to generate a steering torque corresponding to the arithmetically operated steering torque. As a result, the course of the vehicle 1 is changed as illustrated in a dashed-line arrow in FIG. 2A.

Figure 2B:
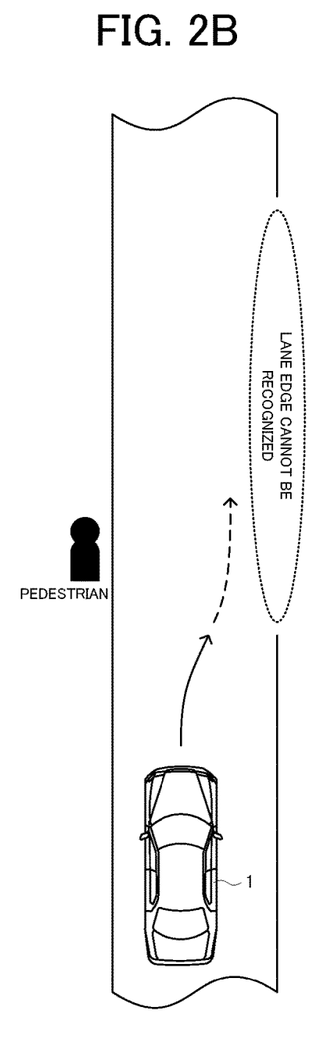
FIG. 2B is a diagram illustrating a specific example of the steering assist according to the embodiment.

FIG. 2B illustrates the behavior of the vehicle 1 when the steering assist is performed by the steering assist unit 11, but the steering assist is canceled by the canceller 13 because the traffic lane is no longer recognized by the traffic lane recognizer 112.

In this case, firstly, if a pedestrian who is within the predetermined range from the vehicle 1 is recognized by the surrounding object recognizer 111 of the steering assist unit 11, the steering torque arithmetic operator 113 may arithmetically operate the avoidance steering torque. When the avoidance steering torque is inputted to the controller 12, the steering actuator 30 is controlled by the controller 12 to generate the steering torque corresponding to the avoidance steering torque.

As a result of the control described above, when the course of the vehicle 1 is changed as illustrated in a solid-line arrow in FIG. 2B, for example, suppose that a white line (i.e., a lane edge) of the traffic lane on the side approached by the vehicle 1 (in other words, on the opposite side of the recognized pedestrian side) is no longer recognized by the traffic lane recognizer 112. At this time, the risk determinator 132 of the canceller 13 may determine whether or not the risk is high in a situation in which the traffic lane recognizer 112 cannot recognize the white line, as the situation in which the vehicle 1 is placed.

If the white line for defining the traffic lane is not recognized, the steering assist may cause the vehicle 1 to deviate from the traffic lane. If the vehicle 1 deviates from the traffic lane, for example, the vehicle 1 possibly contacts or collides with an object that exists on a lane adjacent to the traffic lane. Therefore, in this case, the risk determinator 132 may determine that the risk is high on condition that "the traffic lane recognizer 112 cannot recognize the white line".

If it is determined by the risk determinator 132 that the risk is high, the cancellation processor 133 may transmit a cancellation signal indicating the cancellation of the steering assist, to the steering assist unit 11. As a result, the arithmetic operation of the avoidance steering torque by the steering torque arithmetic operator 113 of the steering assist unit 11 is stopped. At this time, if no measures are taken, the steering torque is not generated from the steering actuator 30. Thus, the vehicle 1 goes straight in a state of inclining to or being directed to the traffic lane, due to a self-aligning torque that acts on the steered wheels of the vehicle 1.

Thus, the cancellation processor 133 may arithmetically operate a steering torque in an opposite direction, which is opposite to a direction of the avoidance steering torque (hereinafter referred to as a "return torque" as occasion demands), at least so that the vehicle 1 does not deviate from the traffic lane (and moreover, so that the vehicle 1 approaches the center of the traffic lane). When the return torque is inputted to the controller 12, the steering actuator 30 is controlled by the controller to generate a steering torque corresponding to the return torque. As a result, the course of the vehicle 1 is changed as illustrated in a dashed-line arrow in FIG. 2B. If the white line cannot be recognized (or the traffic lane cannot be recognized) by the traffic lane recognizer 112 when the pedestrian is recognized by the steering assist unit 11, then, the steering assist by the steering assist unit 11 is not performed.

Figure 2C:
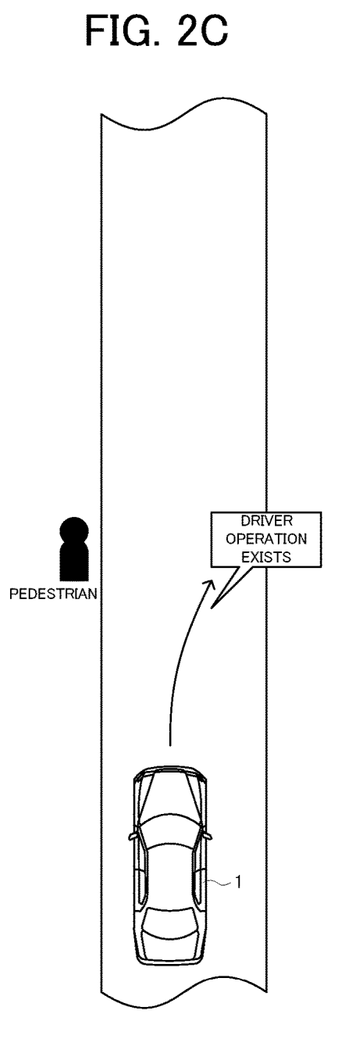
FIG. 2C is a diagram illustrating a specific example of the steering assist according to the embodiment.

FIG. 2C illustrates the behavior of the vehicle 1 when the steering assist is performed by the steering assist unit 11, but the steering assist is canceled by the canceller 13 because it is determined by the driver operation determinator 131 that the driver's operation is performed.

In this case, firstly, if a pedestrian who is within the predetermined range from the vehicle 1 is recognized by the surrounding object recognizer of the steering assist unit 11, the steering torque arithmetic operator 113 may arithmetically operate the avoidance steering torque. When the avoidance steering torque is inputted to the controller 12, the steering actuator 30 is controlled by the controller 12 to generate the steering torque corresponding to the avoidance steering torque.

As a result of the control described above, when the course of the vehicle 1 is changed as illustrated in a solid-line arrow in FIG. 2C, if it is determined by the driver operation determinator 131 that the driver's operation is performed on the basis of the output of the internal sensor 22, then, the cancellaration processor 133 may transmit the cancellation signal indicating the cancellation of the steering assist, to the steering assist unit 11. As a result, the arithmetic operation of the avoidance steering torque by the steering torque arithmetic operator 113 of the steering assist unit 11 is stopped.

The cancellaration processor 133 may change the content of a subsequent process in accordance with the driver's operation. In other words, if the driver performs a steering operation, it is expected that the driver performs the steering operation so that the vehicle 1 drives in the traffic lane. As in the case explained with reference to FIG. 2B, if the cancellaration processor 133 arithmetically operates the return torque and the steering torque corresponding to the return torque is generated, then, the steering torque and the driver's steering operation may interfere with each other (causing the driver to feel discomfort). Thus, in this case, the cancellaration processor 133 may transmit the cancellation signal without arithmetically operating the return torque, and may end the process. Therefore, if the driver performs the steering operation, the steering torque corresponding to the return torque is not generated, and thus, the driver does not feel discomfort.

On the other hand, if the driver does not perform the steering operation (e.g., if the driver performs a deceleration operation), even if the steering torque corresponding to the return torque is generated, a possibility of the interference between the steering torque and the driver's operation (i.e., an operation other than the steering operation) is lower than that when driver performs the steering operation. Moreover, even if the steering operation by the driver is performed in a near future, if the steering torque corresponding to the return torque has been already generated before the steering operation is performed, then, there is a relatively low possibility that the driver feels discomfort. Thus, in this case, the cancellation processor 133 arithmetically operates the return torque. Therefore, if the driver does not perform the steering operation, it is possible to prevent the vehicle 1 from deviating from the traffic lane while preventing the driver from feeling discomfort. The "deceleration operation" conceptually includes not only an operation of the brake pedal, but also stopping the stepping of the accelerator pedal (so-called acceleration off).

(Cancellation Process)

Next, the details of the operation of the drive assistance apparatus 10 will be explained with reference to a flowchart in FIG. 3. Here, in particular, an explanation is given to the operation of the drive assistance apparatus 10 when the steering assist is canceled, as explained with reference to FIG. 2B and FIG. 2C.

Figure 3:
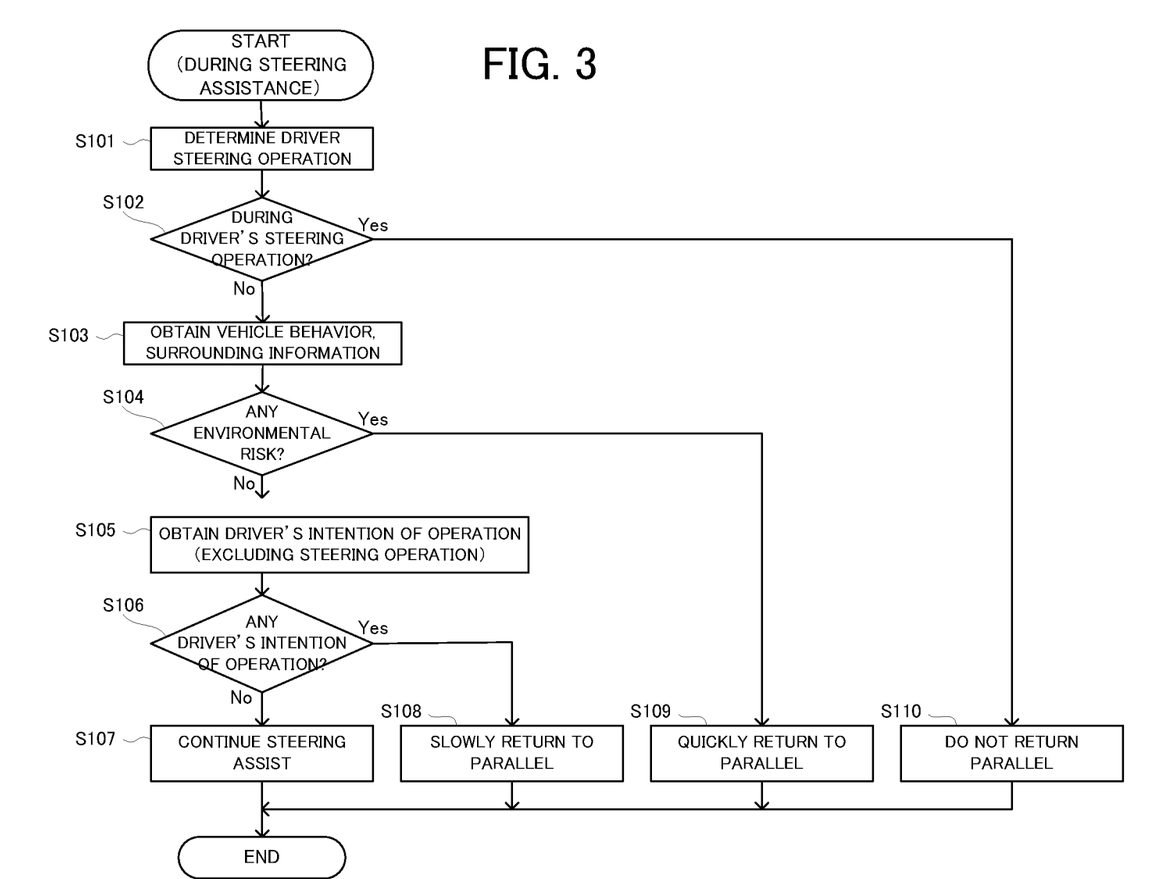
FIG. 3 is a flowchart illustrating a cancellation process for the steering assist according to the embodiment.

In FIG. 3, when the steering assist is performed by the steering assist unit 11, the driver operation determinator 131 of the canceller 13 determines whether or not the steering operation by the driver is performed (step S101). The cancellation processor 133 then determines whether or not it is during the driver's steering operation, on the basis of a result of the step S101 (i.e., a result of the determination by the driver operation determinator 131) (step S102).

In the step S102, if it is determined that it is during the driver's steering operation (the step S102: Yes), the cancellation processor 133 transmits the cancellation signal to the steering assist unit 11 so as to cancel the steering assist by the steering assist unit 11. At this time, the cancellation processor 133 does not arithmetically operate the return torque (step S110).

In the step S102, if it is determined that it is not during the driver's steering operation (the step S102: No), the canceller 13 obtains the output of the internal sensor 22 (corresponding to "VEHICLE BEHAVIOR" in FIG. 3) and the outputs of the surrounding object recognizer 111 and the traffic lane recognizer 112 (corresponding to "SURROUNDING INFORMATION" in FIG. 3) (step S103).

The risk determinator 132 then determines whether or not there is the environmental risk, on the basis of the information obtained in the step S103 (step S104). Here, the risk determinator 132 determines that there is the environmental risk, for example, if a distance between an object (e.g., another vehicle, etc.) that exists on a lane adjacent to the traffic lane and the vehicle 1 is a relatively short, in addition to the case where the white line for defining the traffic lane is no longer recognized by the traffic lane recognizer 12, as described above.

In the step S104, if it is determined that there is the environmental risk (the step S104: Yes), the cancellation processor 133 transmits the cancellation signal to the steering assist unit 11 so as to cancel the steering assist by the steering assist unit 11. The cancellation processor 133 further arithmetically operates the return torque. When the return torque is inputted to the controller 12, the steering actuator 30 is controlled by the controller 12 so as to generate the steering torque corresponding to the return torque. As a result, the course of the vehicle 1 is changed, and for example, the vehicle 1 drives along (e.g. parallel to) the traffic lane (step S109).

In the step S104, if it is determined that there is no environmental risk (the step S104: No), the cancellation processor 133 attempts to obtain the operation by the driver (i.e., an intention of the operation) other than the steering operation from the result of the determination by the driver operation determinator 131 (step S105). The operation by the driver other than the steering operation may include, for example, a turn signal operation or the like, in addition to the deceleration operation described above.

The cancellation processor 133 then determines whether or not the operation by the driver other than the steering operation is performed, on the basis of a result of the step S105 (step S106). In the step S106, if it is determined that the operation by the driver other than the steering operation is performed (the step S106: Yes), the cancellation processor 133 transmits the cancellation signal to the steering assist unit 11 so as to cancel the steering assist by the steering assist unit 11. The cancellation processor 133 further arithmetically operates the return torque. When the return torque is inputted to the controller 12, the steering actuator 30 is controlled by the controller 12 to generate the steering torque corresponding to the return torque. As a result, the course of the vehicle 1 is changed, and for example, the vehicle 1 drives along (e.g. parallel to) the traffic lane (step S108).

In the step S106, if it is determined that the operation by the driver other than the steering operation is not performed (the step S106: No), the cancellation processor 133 does not cancel the steering assist by the steering assist unit 11. As a result, the steering assist by the steering assist unit 11 is continued (step S107). In this case, the step S101 is performed again after a lapse of a predetermined time (e.g., several ten milliseconds to several hundred milliseconds).

In the step S108 and the step S109, the return torque is arithmetically operated. Now, a difference between the both processes will be explained.

In the step S108, the operation by the driver is performed. Thus, if the steering torque corresponding to the return torque that is not intended by the driver is generated by the steering actuator 30, the driver possibly feels discomfort. On the other hand, the vehicle 1 approaches the lane edge of the traffic lane due to the steering assist by the steering assist unit 11. Thus, if the driver's decision or the like is late, the vehicle 1 possibly deviates from the traffic lane. Thus, when arithmetically operating the return torque, the cancellation processor 133 sets a relatively small torque change amount per unit time until the steering torque reaches a target steering torque. By virtue of such a configuration, it is possible to prevent the vehicle 1 from deviating from the traffic lane while preventing the driver from feeling discomfort.

In the step S109, there is the environmental risk, and it is hard to appropriately perform the steering assist by the steering assist unit 11. Thus, when arithmetically operating the return torque, the cancellation processor 133 sets a relatively large torque change amount per unit time until the steering torque reaches a target steering torque. By virtue of such a configuration, at least, it is possible to relatively quickly restore the posture of the vehicle 1 to a state before the steering assist is started, and as a result, it is possible to prevent that the steering assist causes the situation in which the occupant including the driver vehicle 1 is at risk.

(Technical Effect)

If the process when the steering assist is cancelled (hereinafter referred to as the "cancellation process" as occasion demands) is consistent regardless of a cause of the cancellation, the following technical problems may occur.

Suppose that the cancellation process is to generate the steering torque based on the return torque whose torque change amount per unit time is set relatively small, for example, so as to prevent the interference with the operation by the driver. In this case, if the steering assist is canceled because the white line for defining the traffic lane is no longer recognized, and if the cancellation process is performed, then, the driver possibly feels the anxiety that the vehicle 1 may deviate from the traffic lane. In the same manner, the driver possibly feels anxiety when the steering assist is simply canceled (i.e., if the return torque is not arithmetically operated).

Suppose that the cancellation process is to generate the steering torque based on the return torque whose torque change amount per unit time is set relatively large, for example, so as to relatively quickly restore the posture of the vehicle 1 to the state before the steering assist is started. In this case, if the steering assist is canceled because the operation is performed by the driver, and if the cancellation process is performed, then, the driver possibly feels discomfort due to the steering torque that is generated by the cancellation process and that is not intended by the driver.

Thus, on the driving assistance apparatus 10 according to the embodiment, the cancellation process corresponding to the cause of the cancellation of the steering assist (which is, in the embodiment, "there is the environmental risk", "the steering operation by the driver is performed", and "the operation by the driver other than the steering operation is performed") is performed (refer to the steps S108, S109, and S110 in FIG. 3). Therefore, according to the driving assistance apparatus 10, it is possible to cancel the steering assist while preventing the driver from feeling anxiety and discomfort.

Various aspects of embodiments of the present disclosure derived from the embodiment explained above will be explained hereinafter.

A driving assistance apparatus according to an aspect of embodiments of the present disclosure is a driving assistance apparatus including: a recognizer configured to recognize a surrounding environment of a vehicle; and an assist device configured to perform a steering assist in a width direction of a traffic lane on which the vehicle is driving if a pedestrian is recognized by the recognizer within a predetermined range from the vehicle, wherein a steering torque for steering the vehicle in a direction in which the vehicle goes away from the pedestrian is applied to the vehicle in the steering assist, the driving assistance apparatus provided with: a canceller configured to cancel the steering assist if a predetermined cancellation condition is satisfied when the steering assist is performed, wherein the cancellation condition includes: a first condition caused by that at least a part of the traffic lane is not recognized by the recognizer; and a second condition caused by that a vehicle operation by a driver of the vehicle is performed, and the canceller is configured to apply a steering torque in an opposite direction, which is opposite to a direction of the steering torque applied by the steering assist, to the vehicle if the first condition is satisfied and the steering assist is thus cancelled, and is configured to increase a torque change amount per unit time of the steering torque in the opposite direction in comparison with when the second condition is satisfied and the steering assist is thus cancelled.

In the embodiment described above, the "surrounding object recognizer 111" and the "traffic lane recognizer 112" correspond to an example of the "recognizer". The "steering torque arithmetic operator 113" corresponds to an example of the "assist device", and the "canceller 13" corresponds to the "canceller".

On the driving assistance apparatus, if the predetermined cancellation condition is satisfied, the steering assist is cancelled. The predetermined cancellation condition includes the first condition and the second condition. If the second condition is satisfied and the steering assist is thus canceled, the driver has an intention to operate the vehicle. Thus, when cancelling the steering assist, the driving assistance apparatus should not perform an excessive assistance process that may interfere with the driver's operation. On the other hand, if the first condition is satisfied and the steering assist is thus canceled, the steering assist is canceled regardless of the driver's intention. Thus, when cancelling the steering assist, mainly the driving assistance apparatus should perform the assistance process.

On the basis of the aforementioned idea, on the driving assistance apparatus, if the first condition is satisfied and the steering assist is thus canceled, the steering torque in the opposite direction, which is opposite to the direction of the steering torque applied by the steering assist, is applied. Also, the torque change amount per unit time of the steering torque in the opposite direction is increased in comparison with when the second condition is satisfied and the steering assist is thus cancelled.

Therefore, according to the driving assistance apparatus, if the first condition is satisfied and the steering assist is thus canceled, it is possible to relatively quickly return the vehicle that is steered in the direction away from the pedestrian (i.e., to the lane edge side of the traffic lane), in a direction of approaching the pedestrian (e.g., to a central side of the traffic lane). On the other hand, if the second condition is satisfied and the steering assist is thus cancelled, it is possible to prevent the interference between the assistance process by the driving assistance apparatus and the driver's operation. Thus, according to the driving assistance apparatus, it is possible to cancel the steering assist while preventing the driver from feeling discomfort.

In an aspect of the driving assistance apparatus, the first condition is that a lane edge on a far side of the traffic lane from the pedestrian is not recognized by the recognizer in the width direction. According to this aspect, the cancellation of the steering assist makes it possible to avoid, for example, a situation in which the vehicle may deviate from the traffic lane due to the steering assist.

In another aspect of the driving assistance apparatus, said canceller is configured to apply the steering torque in the opposite direction to the vehicle if the second condition is satisfied and the steering assist is thus cancelled because a deceleration operation by the driver is performed.

In this aspect, there is a relatively high possibility that the steering operation is not performed by the driver in the cancellation of the steering assist. This is because the driver who performs the deceleration operation, supposedly decelerates the vehicle, instead of steering the vehicle, to safely pass by the pedestrian. Thus, even if the steering torque in the opposite direction is applied the vehicle, there is a relatively low possibility of the interference with the driver's operation. By the way, if the steering assist is cancelled, the steering torque applied by the steering assist disappears. Thus, the vehicle goes straight toward the edge side of the traffic lane, in a state of inclining to the traffic lane, due to the self-aligning torque that acts on the steered wheels of the vehicle. In this aspect, the steering torque in the opposite direction is applied to the vehicle. Thus, it is possible to adjust at least the posture of the vehicle. As a result, it is possible to prevent the vehicle from deviating from the traffic lane.

In an aspect of the driving assistance apparatus, the canceller is configured not to apply the steering torque in the opposite direction to the vehicle if the second condition is satisfied and the steering assist is thus canceled because a steering operation by the driver is performed, and is configured to apply the steering torque in the opposite direction to the vehicle if the second condition is satisfied and the steering assist is thus cancelled because a vehicle operation other than the steering operation by the driver is performed.

In this aspect, if the steering assist is canceled because the steering operation by the driver is performed, the steering torque in the opposite direction is not applied. As a result, the interference between the steering torque in the opposite direction and the steering operation by the driver is appropriately avoided. In other words, the driver does not feel discomfort caused by applying the steering torque that interferes with the steering operation by the driver.

On the other hand, if the steering assist is cancelled because the vehicle operation other than the steering operation by the driver is performed, the steering torque in the opposite direction is applied. In this case, because the driver does not perform the steering operation, the possibility of the interference between the steering torque in the opposite direction and the vehicle operation by the driver is lower than when the driver performs the steering operation. It is therefore possible to prevent the vehicle from deviating from the traffic lane while preventing the driver from feeling discomfort.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A driving assistance apparatus comprising:
   a first processor programmed to:
      recognize a surrounding environment of a vehicle, including a traffic lane on which the vehicle is traveling; and
      perform a steering assist when a pedestrian is recognized within a predetermined range from the vehicle, wherein an avoidance steering torque for steering the vehicle in a direction which is a width direction of the traffic lane, on which the vehicle is driving; and in which the vehicle goes away from the pedestrian, is applied to the vehicle during the steering assist; and a second processor programmed to:

determine whether a first condition is met, wherein the first condition is that at least a part of the traffic lane is not recognized by the first processor while the steering assist is being performed by the first processor;

determine whether a second condition is met, wherein the second condition is a vehicle operation is performed by a driver of the vehicle while the steering assist is being performed by the first processor;

when the first condition is met, cancel the steering assist and apply a steering torque, which changes a first change amount per unit time, in an opposite direction from a direction of the avoidance steering torque applied by the steering assist, to the vehicle, when the second condition is met, cancel the steering assist and apply a steering torque, which changes a second change amount per unit time, in the opposite direction from the direction of the avoidance steering torque applied by the steering assist, to the vehicle, wherein the first change amount is greater than the second change amount.

2. The driving assistance apparatus according to claim 1, wherein the first condition is that a lane edge of the traffic lane farther from the pedestrian in the width direction of the traffic lane is not recognized by the first processor.

3. The driving assistance apparatus according to claim 1, wherein the vehicle when the vehicle operation of the second condition is satisfied by a deceleration operation, as the vehicle operation; performed by the driver.

4. The driving assistance apparatus according to claim 2, wherein the vehicle operation of the second condition is satisfied by a deceleration operation, as the vehicle operation; performed by the driver.

5. The driving assistance apparatus according to claim 1, wherein the second processor is programmed to apply the steering torque in the opposite direction to the vehicle when the second condition is satisfied by the vehicle operation other than a steering operation performed by the driver.

6. The driving assistance apparatus according to claim 2, wherein the second processor is programmed to apply the steering torque in the opposite direction to the vehicle when the second condition is satisfied by the vehicle operation other than a steering operation performed by the driver.

7. The driving assistance apparatus according to claim 3, wherein the second processor is programmed to apply the steering torque in the opposite direction to the vehicle when the second condition is satisfied by the vehicle operation other than a steering operation performed by the driver.

* * * * *